United States Patent
Tenzer et al.

(10) Patent No.: US 10,096,834 B2
(45) Date of Patent: Oct. 9, 2018

(54) METHOD FOR MANUFACTURING A POLYACRYLONITRILE-SULFUR COMPOSITE MATERIAL

(71) Applicant: Robert Bosch GmbH, Stuttgart (DE)

(72) Inventors: Martin Tenzer, Nuertingen (DE); Malte Rolff, Leonberg (DE); Jean Fanous, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 317 days.

(21) Appl. No.: 14/406,267

(22) PCT Filed: May 3, 2013

(86) PCT No.: PCT/EP2013/059308
§ 371 (c)(1),
(2) Date: Dec. 8, 2014

(87) PCT Pub. No.: WO2013/182362
PCT Pub. Date: Dec. 12, 2013

(65) Prior Publication Data
US 2015/0155560 A1    Jun. 4, 2015

(30) Foreign Application Priority Data

Jun. 8, 2012  (DE) .................. 10 2012 209 644

(51) Int. Cl.
*H01M 4/00*    (2006.01)
*C08F 8/34*    (2006.01)
(Continued)

(52) U.S. Cl.
CPC .............. *H01M 4/604* (2013.01); *C08F 8/34* (2013.01); *H01M 4/364* (2013.01); *H01M 4/382* (2013.01);
(Continued)

(58) Field of Classification Search
CPC ...... H01M 4/604; H01M 4/364; H01M 4/382; H01M 4/5815; H01M 4/623; H01M 4/625;
(Continued)

(56) References Cited

U.S. PATENT DOCUMENTS

| 2011/0318654 | A1* | 12/2011 | Janssen | ................ | H01M 4/136 |
| | | | | | 429/338 |
| 2012/0059129 | A1* | 3/2012 | He | .......................... | C08F 20/44 |
| | | | | | 525/344 |
| 2013/0029222 | A1* | 1/2013 | Niwa | .................... | H01M 4/587 |
| | | | | | 429/211 |

FOREIGN PATENT DOCUMENTS

| CN | 102399339 A | 4/2012 |
| CN | 103502283 A | 1/2014 |

(Continued)

OTHER PUBLICATIONS

Fanous et al. "Structure-Related Electrochemistry of Sulfur-Poly(acrylonitrile) Composite Cathode Materials for Rechargeable Lithium Batteries". Published Oct. 20, 2011. Chemistry of Materials. American Chemical Society. 23, 5024-5028. Total pp. 5.*

(Continued)

*Primary Examiner* — Harold Y Pyon
*Assistant Examiner* — Danny N Kang
(74) *Attorney, Agent, or Firm* — Norton Rose Fulbright US LLP; Gerard Messina

(57) ABSTRACT

A method is provided for manufacturing a polyacrylonitrile-sulfur composite material, the polyacrylonitrile-sulfur composite material having an $sp^2$ hybrid proportion, with respect to the total carbon atoms included in the composite material, of greater than or equal to 85% including the method steps: a) reaction of polyacrylonitrile with sulfur at a temperature of greater than or equal to 450° C., in particular greater than or equal to 550° C.; b) immediate purification of the product (Continued)

obtained in method step a); and c) drying the purified product, if necessary. A composite material manufactured in this way may be used in particular in an active material of a cathode of a lithium-ion battery and offers a particularly high rate capacity. In addition, methods are provided for manufacturing an active material for an electrode, a polyacrylonitrile-sulfur composite material and an energy store.

21 Claims, 2 Drawing Sheets

(51) Int. Cl.
*H01M 4/60* (2006.01)
*H01M 4/36* (2006.01)
*H01M 4/38* (2006.01)
*H01M 4/58* (2010.01)
*H01M 4/62* (2006.01)
*H01M 10/052* (2010.01)
*H01M 4/1397* (2010.01)
*H01M 10/0525* (2010.01)

(52) U.S. Cl.
CPC ......... *H01M 4/5815* (2013.01); *H01M 4/623* (2013.01); *H01M 4/625* (2013.01); *H01M 10/052* (2013.01); *H01M 4/1397* (2013.01); *H01M 10/0525* (2013.01)

(58) Field of Classification Search
CPC ............. H01M 10/052; H01M 4/1397; H01M 10/0525; Y02T 10/7011
USPC ........................................................ 252/500
See application file for complete search history.

(56) References Cited

FOREIGN PATENT DOCUMENTS

| | | |
|---|---|---|
| CN | 103502284 A | 1/2014 |
| DE | 102010027950 | 10/2011 |
| EP | 2337126 | 6/2011 |
| WO | WO2012/150060 | 11/2012 |

OTHER PUBLICATIONS

International Search Report for PCT/EP2013/059308, dated Sep. 4, 2013.

* cited by examiner

METHOD FOR MANUFACTURING A POLYACRYLONITRILE-SULFUR COMPOSITE MATERIAL

FIELD OF THE INVENTION

The present invention relates to a method for manufacturing a polyacrylonitrile-sulfur composite material, in particular as an active material for an alkali-sulfur battery, for example for a lithium-sulfur battery. In addition, the present invention relates to a method for manufacturing an active material for an electrode, a polyacrylonitrile-sulfur composite material and an energy store.

BACKGROUND INFORMATION

To manufacture batteries having a large energy density, research is presently being done on lithium-sulfur battery technology (in short: Li/S). If the cathode of a lithium-sulfur cell were made completely of elemental sulfur, an energy content of greater than 1,000 Wh/kg could theoretically be achieved. However, elemental sulfur is neither ionically nor electrically conductive, so additives must be added to the cathode, which significantly reduce the theoretical value. In addition, elemental sulfur is conventionally reduced during the discharge of a lithium-sulfur cell to form soluble polysulfides $S_x^{2-}$. These may diffuse into areas, for example, the anode area, in which they may no longer participate in the electrochemical reaction of the following charge/discharge cycles. In addition, polysulfides may be dissolved in the electrolyte, which may not be reduced further. In practice, the sulfur utilization and therefore the energy density of lithium-sulfur cells is presently significantly lower and is currently estimated to be between 400 Wh/kg and 600 Wh/kg.

With regard to lithium-sulfur cells, Nazar et al. in Nature Materials, Vol. 8, June 2009, [pp] 500-506 describe that carbon nanotubes promote retention of polysulfides in the cathode chamber and ensure sufficient electrical conductivity at the same time.

Wang et al. describe in Advanced Materials, 14, 2002, No. 13-14, pp 963-965 and Advanced Functional Materials, 13, 2003, No. 6, pp 487-492 and Yu et al. describe in Journal of Electroanalytical Chemistry, 573, 2004, [pp] 121-128 and Journal of Power Sources 146, 2005, [pp] 335-339 another technology in which polyacrylonitrile (in short: PAN) is heated with an excess of elemental sulfur, the sulfur, on the one hand, being cyclized, while forming H₂S polyacrylonitrile, to form a polymer having a conjugated π-system and, on the other hand, being bound in the cyclized matrix, in particular via sulfur-carbon bonds.

SUMMARY

A subject matter of the present invention is a method for manufacturing a polyacrylonitrile-sulfur composite material, the polyacrylonitrile-sulfur composite material having an sp² hybrid proportion greater than or equal to 85% with respect to the total carbon atoms included in the composite material, including the steps:
 a) polyacrylonitrile reacting with sulfur at a temperature of greater than or equal to 450° C., in particular greater than or equal to 550° C.;
 b) immediate purifying of the product obtained in method step a); and
 c) drying the purified product, if necessary.

A polyacrylonitrile-sulfur composite material (SPAN) may be understood in particular as a composite material which is manufactured by a reaction of polyacrylonitrile (PAN) with sulfur (S).

An sp² hybrid proportion may be understood within the sense of the present invention to be in particular the proportion of carbon atoms present in an sp² hybridized form which are contained in the composite material. This may be ascertainable with the aid of Raman spectroscopy, similarly to determining the sp² hybrid proportion of graphitic carbon materials. The latter method is widely established in literature and was described, for example, by A. C. Ferrari et al. In Phys. Rev. B, 61, 2000, No. 20, [pp] 14095-14107. In this method known to those skilled in the art, the sp² hybrid proportion is ascertained using the exact position of the so-called G-bands (in the range of 1500-1600 cm⁻¹) and the intensity ratio of the so-called D-bands (in the range of 1300-1400 cm⁻¹) to the G-bands (in the range of 1500-1600 cm⁻¹). Similarly to this method, the sp² hybrid proportions of SPAN may be defined within the sense of the present invention as follows: An sp² hybrid proportion in the SPAN of greater than or equal to 85% may exist in particular when the position of the "G-bands" is greater than or equal to 1530 cm⁻¹ and the intensity ratio of "D-bands" (position between approximately 1310-1350 cm⁻¹) to "G-bands" is greater than or equal to 0.75. An sp² hybrid proportion of the SPAN of greater than or equal to 90% may be present in particular when the position of the "G-bands" is at greater than or equal to 1545 cm⁻¹ and the intensity ratio of "D-bands" (position between approximately 1310-1350 cm⁻¹) to "G-bands" is greater than or equal to 1.45. An sp² hybrid proportion of the SPAN of greater than or equal to 95% may be present in particular when the position of the "G-bands" is at greater than or equal to 1550 cm⁻¹ and the intensity ratio of "D-bands" (position between approximately 1310-1350 cm⁻¹) to "G-bands" is greater than or equal to 1.60.

In particular, with the aid of a method according to the present invention, a polyacrylonitrile-sulfur composite material may be produced, which has an sp² hybrid proportion, with respect to the total carbon atoms included in the composite material, of greater than or equal to 85%, in particular of greater than or equal to 90%, for example of greater than or equal to 95%. In this case, the polyacrylonitrile-sulfur composite material may particularly serve as an active material of an electrode, particularly of a lithium-sulfur battery.

In particular, with the aid of such a structure in the composite material, a considerably improved intrinsic conductivity may be achieved. Improved conductivity may particularly have a positive effect on the charging behavior or discharging behavior of an energy store, which includes an electrode including a polyacrylonitrile-sulfur composite material manufactured as described above. In detail, in the purely exemplary case of a lithium-sulfur battery, lithium ions should reach the sulfur atoms contained in the active material during a discharging process, while, at the same time, electrons are transported to the reaction centers. Thus, electric conductivity is a particularly important property for an electrode material. In other words, with the aid of high electric conductivity of the cathode-active material, a cathode-active material capable of high rates may be obtained.

This may in particular be achieved according to the present invention by the fact that, due to the method according to the present invention, the structure of the composite material is particularly homogeneous and has a very high proportion of sp² hybridized carbon atoms. The carbon atoms being in such a high state of hybridization may in particular result in the conjugated π-system being particularly extensive and homogeneous, which may in particular create an improved electric conductivity in the composite material. Particularly in large currents this may result in a lower ohmic resistance in the composite material, which considerably improves the rates, i.e., the behavior in regard to the charging rate and the discharging rate.

Accompanying this, the advantage may be achieved by the method according to the present invention that the manufactured composite material experiences a lower capacitance drop in particular in the case of large current intensities, i.e., a particularly stable capacitance may be obtained.

Such an electrode material according to the present invention may be manufactured particularly simply, since in particular the use of complex and multistage syntheses may be omitted. In contrast thereto, the method according to the present invention may be carried out particularly simply and cost-effectively, so that also the composite material or the active material as well as an electrode or battery equipped with the composite material is manufacturable particularly cost-effectively.

In addition, the polyacrylonitrile-sulfur composite material produced according to the present invention may generally effectuate an improved capacity and cycle stability. Improving the use of sulfur, for example, may be achieved in polyacrylonitrile-sulfur composite materials on the one hand by the fact that the polyacrylonitrile-sulfur composite material offers a conductive surface area, which may be used for the reduction of the elemental sulfur, which is not covalently bound in its initial state, or which is unbound in the cathode material. On the other hand, the polyacrylonitrile-sulfur composite material may impede a migration, for example, to the area of the anode, of polysulfides generated by a reduction of the elemental sulfur, through the covalently bound sulfur of the polyacrylonitrile-sulfur composite material reacting with the polysulfides and covalently bonding with them. During this process, the polysulfide anions may open sulfur bridges in the polyacrylonitrile-sulfur composite material, which, for example, produces two polysulfide monoanions each, which are bound covalently at one end of the chain to the cyclized polyacrylonitrile framework. During the subsequent reduction, such polysulfide chains may be built up gradually. Since these polysulfide chains are bound covalently to the cyclized polyacrylonitrile framework, they may also no longer be detached from the electrolyte. In this way, the sulfur may advantageously be better utilized and thus the tension and the capacity as well as the cycle stability may be increased.

During this process, such a structure, in which the composite material has an $sp^2$ hybrid proportion, with respect to the total carbon atoms included in the composite material, of greater than or equal to 85%, in particular of greater than or equal to 90%, for example of greater than or equal to 95% may be producible in a surprising manner by specifically choosing the reaction parameters, particularly in a reaction of polyacrylonitrile with sulfur. In particular, according to the present invention, a high synthesis temperature is chosen, which is within a range of greater than or equal to 450° C., particularly greater than or equal to 550° C. Particularly in conjunction with an immediate purification of the obtained product and thus the immediate removal of further sulfur from the polyacrylonitrile-sulfur composite material, this step may make it possible to obtain a π-system as previously described in the composite material in a surprising manner.

In the case of such composite materials, suggestions furthermore exist of a sulfur-carbon bond, which therefore fixedly bonds the polysulfides on the polymer matrix. A sulfur-polyacrylonitrile composite therefore results having various functional groups and chemical bonds, which may all have different properties and contributions with respect to electrochemical performance and aging behavior.

In detail, the method for manufacturing a polyacrylonitrile-sulfur composite material includes the following steps:

In a first method step a) polyacrylonitrile reacts with sulfur at a temperature of greater than or equal to 450° C., in particular greater than or equal to 550° C.

The reaction may be carried out in less than 12 hours, in particular less than 8 hours, for example, 5 hours to 7 hours, for example, in approximately 6 hours. In particular, during the reaction, initially a first temperature, for example, in a range of ≥300° C. to ≤600° C., and then a second temperature, which is higher than the first temperature, for example, in a range of ≥300° C. to ≤400° C., may be set. The phase within which the second temperature is set may be longer in particular than the phase in which the first temperature is set. Cyclization of the polyacrylonitrile may be caused by the first temperature phase. The formation of covalent sulfur-carbon bonds may essentially be carried out during the second temperature phase. Because a lower temperature is set in this case, longer polysulfide chains may, as explained above, be linked to the cyclized polyacrylonitrile framework.

As described above, the reaction thus takes place at a comparatively high temperature, which is essentially considerably higher than the temperatures used for a reaction of polyacrylonitrile with sulfur known from the related art. The generally not preferred effect is utilized, where the sulfur content in the obtained product decreases when the reaction temperature of polyacrylonitrile and sulfur is high. This effect is utilized according to the present invention, in order to, in conjunction with the method step b), including an immediate purification of the product obtained in method step a), a structure of the cathode material is created as described above, which, due to the conjugated system, exhibits a particularly advantageous electric conductivity and thus rate capacity.

An immediate purification may, within the meaning of the present invention, particularly mean a purification after the reaction of the polyacrylonitrile with the sulfur in a suitable ratio without adding additional components involved in the reaction or other components, particularly additional polyacrylonitrile or sulfur, for example. A conductive additive or binder may also be added after the purification, without departing from the scope of the present invention.

In another method step, the purified product may be dried according to method step c), if necessary. In this way, a structure may be created, which may immediately be suitable as a cathode material or as an active material for a cathode of a lithium-sulfur-cell.

Such a polyacrylonitrile-sulfur composite material with a defined and as previously implemented hybridization structure may be manufactured, which may be used particularly advantageously as a cathode material for alkali-sulfur cells, in particular lithium-sulfur cells, in particular to achieve good long-term stability or electrochemical cycle stability and particularly high electrical conductivity, including a good rate capacity.

Within the scope of one embodiment, the purification according to method step a) may be carried out by a Soxhlet extraction, in particular the Soxhlet extraction being carried out by use of an organic solvent. In particular, the Soxhlet extraction may be carried out using an apolar solvent or solvent mixture, for example, toluene, and the excess sulfur may be removed, in order to obtain a hybridization rate of the polyacrylonitrile sulfur composite material, which is in a range of greater than or equal to 85% of all carbon atoms. It has been found that particularly when using such a purification method, a particularly high $sp^2$ hybrid proportion may exist in the carbon atoms contained in the composite material.

Within the scope of another embodiment, method step a) may be carried out under an inert gas atmosphere. Surprisingly, it has been found that an inert gas atmosphere may contribute to obtaining a particularly homogeneous and defined structure of the polyacrylonitrile-sulfur composite material. An inert gas atmosphere may be understood in particular as an atmosphere of a gas which is nonreactive in the case of the conditions prevailing during method step a). For example, an inert gas atmosphere may be formed by argon or nitrogen.

Within the scope of another embodiment, a cyclized polyacrylonitrile may react with sulfur to a polyacrylonitrile-sulfur composite material having an $sp^2$ hybrid proportion of greater than or equal to 85%, particularly of greater than or equal to 90%, for example greater than or equal to 95%, during method step a), whereby the cyclized polyacrylonitrile may be obtained using a reaction of polyacrylonitrile to cyclized polyacrylonitrile.

In the first method step, for example, initially an electrically conductive base in the form of the electrically conductive, cyclized polyacrylonitrile (cPAN) may be produced in this embodiment. In the second method step, the reaction with the electrochemically active sulfur may be carried out, in particular this being covalently bound to the electrically conductive framework made of cyclized polyacrylonitrile while forming a polyacrylonitrile-sulfur composite material (ScPan). The reaction conditions may advantageously be optimized to the particular reaction by a separation into two partial reactions. The first method step is similar to a dehydration reaction known from carbon fiber manufacturing, the second method step being similar to a reaction from a further, completely different technical field, namely the vulcanization reaction of rubber.

The cyclization may be carried out in particular in an oxygenated atmosphere, for example, an air or oxygen atmosphere. The cyclization may be carried out, for example, at a temperature in a range of greater than or equal to 150° C. to less than or equal to 500° C., in particular greater than or equal to 150° C. to less than or equal to 330° C. or less than or equal to 300° C. or less than or equal to 280° C., for example, greater than or equal to 230° C. to less than or equal to 270° C. The reaction time of the first method step may advantageously be less than 3 hours, in particular less than 2 hours, for example, less than 1 hour. In particular, the first method step may be carried out in the presence of a cyclization catalyst. For example, catalysts known from carbon fiber manufacturing may be used as cyclization catalysts. The reaction temperature and/or the reaction time of the reaction of the polyacrylonitrile with the sulfur may advantageously be reduced by the addition of a cyclization catalyst.

The sulfur atoms may be bound to the cyclized polyacrylonitrile framework in the polyacrylonitrile-sulfur composite material both directly by covalent sulfur-carbon bonds and also indirectly by one or multiple covalent sulfur-sulfur bonds and one or multiple sulfur-carbon bonds.

Alternatively or additionally thereto, a part of the sulfur atoms of the polyacrylonitrile-sulfur composite material, for example, in the form of polysulfide chains, may be covalently bound on both sides intra-molecularly with a cyclized polyacrylonitrile strand, in particular with formation of an S-heterocycle fused on the cyclized polyacrylonitrile strand, and/or intermolecularly with two cyclized polyacrylonitrile strands, in particular with formation of a bridge, in particular a polysulfide bridge, between the cyclized polyacrylonitrile strands.

Within the scope of another embodiment, polyacrylonitrile may be reacted with sulfur in the presence of a catalyst. The reaction temperature and the reaction time may advantageously be reduced by the addition of a catalyst. By reducing the reaction temperature, in addition the chain length of polysulfides which are covalently bound to the cyclized polyacrylonitrile may also be increased. This is because elemental sulfur exists at room temperature in the form of S8 rings. At temperatures above room temperature, sulfur exists in the form of Sx chains of moderate chain length, for example, of 6 to 26 sulfur atoms, or long chain length, for example, of 103 to 106 sulfur atoms. A thermal cracking process begins above 187° C. and the chain length decreases again. From 444.6° C. (boiling point), gaseous sulfur having a chain length of 1-8 atoms exists. The use of a vulcanization catalyst has the advantage that at a lower temperature, longer intermolecular and/or intramolecular sulfur bridges, which are covalently bound to polyacrylonitrile, in particular cyclized polyacrylonitrile, may be introduced into the polyacrylonitrile-sulfur composite material. Thus, a high sulfur content of the polyacrylonitrile-sulfur composite material and therefore a higher capacitance and energy density of the alkali-sulfur cell to be equipped with the cathode material, in particular a lithium-sulfur cell, may advantageously again be achieved. This may result in a reduction of the cycle stability, which may be compensated for by the selection of a suitable electrolyte, however.

Suitable catalysts are known from the technical field of rubber vulcanization. The reaction is therefore preferably carried out in this case at least sometimes in the presence of a vulcanization catalyst or vulcanization accelerator. In particular, the vulcanization catalyst or vulcanization accelerator may include at least one sulfide radical starter or may be made thereof. In particular, the sulfide radical starter may be selected from the group including sulfide metal complexes, for example, obtainable by reaction of zinc oxide (ZnO) and tetramethyl thiuram disulfide or N, N-dimethyl thiocarbamate, sulfene amides, for example, 2-mercaptobenzothiazole amine derivatives, and combinations thereof. For example, the reaction mixture may include greater than or equal to 3 wt.-% to less than or equal to 5 wt.-% zinc oxide and optionally greater than or equal to 0.5 wt.-% to less than or equal to 1 wt.-% tetramethyl thiuram disulfide. To reduce the reaction speed or be able to end a reaction phase at an increased reaction speed, for example, due to the catalyst, the reaction is carried out at least temporarily in the presence of a vulcanization inhibitor. Vulcanization inhibitors suitable for this purpose are also known from the technical field of rubber vulcanization. For example, N-(cyclohexylthio) phthalamide may be used as a vulcanization inhibitor. The properties of the polyacrylonitrile-sulfur composite material may be set in a targeted way by the use and the duration of the use of the catalyst, in particular the vulcanization catalyst or vulcanization accelerator and/or vulcanization inhibitor. The catalyst and optionally the inhibitor are optionally partially or completely removed in a removal step.

Within the scope of another embodiment, an excess of sulfur may be used in method step a). For example, the weight ratio of sulfur to, particularly cyclized, polyacrylonitrile in percent by weight may be greater than or equal to 1:1, particularly greater than or equal to 1.5:1, for example greater than or equal to 2:1, for example greater than or equal to 3:1, and/or less than or equal to 20:1, in particular less than or equal to 15:1, or less than or equal to 10:1, for example less than or equal to 5:1, or less than or equal to 3:1, or less than or equal to 2.5:1, or less than or equal to 2:1. The excess elemental sulfur used during the manufacturing is removed thereafter, for example, by sublimation at high reaction temperatures or, as explained above, by a Soxhlet extraction. In particular, a composite material having a particularly advantageous conductivity may be produced by sulfur excess, which may further positively influence the rate capacity.

With regard to further features and advantages of the method according to the present invention for manufacturing a polyacrylonitrile-sulfur composite material, reference is hereby explicitly made to the explanations in conjunction with the method according to the present invention for manufacturing an active material for an electrode, to the polyacrylonitrile-sulfur-composite material, its use, to the energy store, the figures and the description of the figures.

The object of the present invention is furthermore a method for manufacturing an active material for an electrode, in particular for a cathode of a lithium-sulfur battery, including a method as described above for manufacturing a polyacrylonitrile-sulfur composite material. The fact may be utilized in particular here that a polyacrylonitrile-sulfur composite material manufactured as described above, in particular as an active material of an electrode, in particular a cathode, for a lithium-sulfur battery may have advantageous properties, such as good conductivity and, furthermore, a high rate capacity in particular.

Within the scope of one embodiment, the method may furthermore include the following method step:

d) admixing at least one electrically conductive additive to the polyacrylonitrile-sulfur composite material, in particular selected from the group including carbon black, graphite, carbon fibers, carbon nanotubes, and mixtures thereof.

As an example, greater than or equal to 0.1 wt.-% to less than or equal to 30 wt.-%, for example, greater than or equal to 5 wt.-% to less than or equal to 20 wt.-%, of electrically conductive additives may be admixed. The conductivity and therefore the rate capacity of the mixture obtained may be even further improved by admixing an electrically conductive additive, which makes a use as an active material in an electrode particularly advantageous.

Within the scope of another embodiment, the method may furthermore include the following method step:

e) admixing at least one binder, in particular polyvinylidene fluoride and/or polytetrafluoroethylene, to the polyacrylonitrile-sulfur composite material.

As an example, greater than or equal to 0.1 wt.-% to less than or equal to 30 wt.-%, for example, greater than or equal to 5 wt.-% to less than or equal to 20 wt.-%, of binders may be admixed to the composite material and, if necessary, to the conductive additive. Furthermore, the binder or binders may be admixed with the addition of N-methyl-2-pyrrolidone as a solvent. In particular the stability of the cathode material may be improved by admixing binders, which may improve a use in electrochemical energy stores.

Within the scope of another embodiment, in method step d) and/or in method step e), greater than or equal to 60 wt.-% to less than or equal to 90 wt.-%, in particular greater than or equal to 65 wt.-% to less than or equal to 75 wt.-%, for example, 70 wt.-% polyacrylonitrile-sulfur composite material may be used, and/or in method step d), greater than or equal to 0.1 wt.-% to less than or equal to 30 wt.-%, for example, greater than or equal to 5 wt.-% to less than or equal to 20 wt.-% electrically conductive additives may be admixed, and/or in method step e), greater than or equal to 0.1 wt.-% to less than or equal to 30 wt.-%, for example, greater than or equal to 5 wt.-% to less than or equal to 20 wt.-% binders may be admixed.

The sum of the wt.-% values of polyacrylonitrile-sulfur composite material, electrically conductive additives, and binders may result in particular in a total of 100 wt.-%, depending on the usage.

With regard to further features and advantages of the method according to the present invention for manufacturing an active material for an electrode, reference is hereby explicitly made to the explanations in conjunction with the method according to the present invention for manufacturing a polyacrylonitrile-sulfur composite material, to the polyacrylonitrile-sulfur composite material, to its use, to the energy store, as well as to the figures and the description of the figures.

The subject matter of the present invention is further a polyacrylonitrile-sulfur composite material, manufactured using a method as described above, including an $sp^2$ hybrid proportion, with respect to the total carbon atoms included in the composite material, in a range of greater than or equal to 85%, in particular greater than or equal to 90%, for example greater than or equal to 95%. Such a polyacrylonitrile-sulfur composite material exhibits a particularly good conductivity, which may result in a particularly high rate capacity when used as an active material in an electrode.

With regard to further features and advantages of the polyacrylonitrile-sulfur composite material, reference is hereby explicitly made to the explanations in conjunction with the method according to the present invention for manufacturing polyacrylonitrile-sulfur composite material, to the method for manufacturing an active material for an electrode, to its use, to the energy store, to the figures, as well as to the description of the figures.

The object of the present invention is furthermore a use of a polyacrylonitrile-sulfur composite material, manufactured as explained above, as an active material in an electrode, in particular in a cathode of a lithium-ion battery.

With regard to particular features and advantages of the use according to the present invention, reference is hereby explicitly made to the explanations in conjunction with the method according to the present invention for manufacturing polyacrylonitrile-sulfur composite material, to the method for manufacturing an active material for an electrode, to the polyacrylonitrile-sulfur composite material according to the present invention, to the energy store, to the figures, as well as to the description of the figures.

Another subject matter of the present invention is an energy store, particularly a lithium-sulfur battery, including an electrode with an active material, which exhibits a polyacrylonitrile-sulfur composite material, which is designed as described above.

For the embodiment of such an energy store, the active material may include a polyacrylonitrile-sulfur composite material designed as described above, in particular for forming a slurry for manufacturing a cathode, furthermore admixed with at least one solvent, for example, N-methyl-2-pyrrolidone. Such a slurry may be applied, for example, by a doctor blade, to a carrier material, for example, an aluminum plate or foil. The solvents are removed again, preferably completely, in particular by a drying method, preferably after the application of the active material and prior to the assembly of the lithium-sulfur cell.

The active material-carrier material assembly may subsequently be divided into multiple active material-carrier material units, for example, by stamping or cutting.

The active material-carrier material assembly or units may be assembled with a lithium metal anode, for example, in the form of a plate or foil made of metallic lithium, to form a lithium-sulfur cell.

In particular an electrolyte may be added. The electrolyte may be formed in particular from at least one electrolyte solvent and at least one conducting salt. The electrolyte solvent may fundamentally be selected from the group including carboxylic acid esters, in particular cyclic or acyclic carbonates, lactones, ethers, in particular cyclic or acyclic ethers, and combinations thereof. For example, the electrolyte solvent may include diethyl carbonate (DEC), dimethyl carbonate (DMC), propylene carbonate (PC), ethylene carbonate (EC), 1,3-dioxolane (DOL), 1,2-dimethoxyethane (DME) or a combination thereof or may be made thereof. The conducting salt may be selected, for example, from the group including lithium hexafluorophosphate ($LiPF_6$), lithium bis (trifluoromethyl sulfonyl) imide (LiTFSI), lithium tetrafluoroborate ($LiBF_4$), lithium trifluoromethane sulfonate ($LiCF_3SO_3$), lithium chlorate ($LiClO_4$), lithium bis (oxalato) borate (LiBOB), Lithium Difluorooxalatoborate (LiDFOB), lithium fluoride (LiF), lithium nitrate ($LiNO_3$), lithium hexafluoroarsenate ($LiAsF_6$), and combinations thereof. In addition, electrolyte additives, such as vinylene carbonate (VC), for example, may also be included. Generally, a solid electrolyte may also be used as an electrolyte.

With respect to the above-mentioned active materials, in particular to avoid reactions between the elemental sulfur and the electrolyte, cyclic ethers, acyclic ethers, and combinations thereof as solvents, and/or lithium bis (trifluoromethyl sulfonyl) imide (LiTFSI) as a conducting salt have proven to be particularly advantageous.

Such an energy store may in particular be a mobile or stationary energy store. For example, the energy store may be an energy store for a vehicle, for example, an electric or hybrid vehicle, or a power tool or electrical device, for example, a screwdriver or a gardening device, or an electronic device, for example, a portable computer and/or a telecommunications device, such as a mobile telephone, PDA, or a high-energy storage system for a house or a facility. Since the alkali-sulfur cells or batteries according to the present invention have a very high energy density, they are particularly suitable for vehicles and stationary storage systems, such as high-energy storage systems for houses or facilities.

With regard to additional features and advantages of the energy store according to the present invention, reference is hereby explicitly made to the explanations in conjunction with the method according to the present invention for manufacturing polyacrylonitrile-sulfur composite material, to the method for manufacturing an active material for an electrode, to the polyacrylonitrile-sulfur composite material according to the present invention, to its use according to the present invention, to the figures, as well as to the description of the figures.

DETAILED DESCRIPTION

An example is shown hereafter of manufacturing a polyacrylonitrile-sulfur composite material according to the present invention or an active material based thereon or an electrode according to the present invention for a lithium-sulfur battery with a subsequent electrochemical characterization. In particular, a polyacrylonitrile-sulfur composite material is manufactured as described hereafter, the polyacrylonitrile-sulfur composite material having an $sp^2$ hybrid proportion, with respect to the total carbon atoms included in the composite material, of greater than or equal to 85%.

For this purpose, polyacrylonitrile (PAN) is mixed with sulfur in a first method step at a ratio of 1:3 (wt.-%). The mixture is heated in an inert gas atmosphere to a temperature of 330° C. (comparison sample) or 550° C. (sample according to the present invention) for six hours. The thus obtained product is then immediately freed from excess elemental sulfur with toluene using a Soxhlet extraction for six hours and dried. The finished composite has a sulfur content of 41 wt.-% (330° C.) or 31 wt.-% (550° C.).

During this process, particularly a cyclized polyacrylonitrile reacts with sulfur to a polyacrylonitrile-sulfur composite material having an $sp^2$ hybrid proportion of greater than or equal to 95%, the cyclized polyacrylonitrile being obtained through a reaction of polyacrylonitrile to cyclized polyacrylonitrile.

In a next step, the sulfurous, cyclized polyacrylonitrile, i.e., the finished composite, is processed to form a cathode slurry to implement a cathode-active material. For this purpose, the active material (SPAN), carbon black (for example, carbon black available under the trade name Super P Li) as an electrically conductive additive, and polyvinylidene fluoride (PVDF) as a binder are mixed and homogenized in a ratio of 70:15:15 (in wt.-%) in N-methyl-2-pyrrolidone (NMP) as a solvent. The slurry is spread by a doctor blade onto an aluminum foil and dried. After complete drying, a cathode is stamped out and installed in a test cell against a lithium metal anode. Various cyclic and linear carbonates (DEC, DMC, EC) and mixtures thereof with a lithium-containing conducting salt (for example, $LiPF_6$, lithium-bis (trifluoromethane sulfonyl) imide (LiTFSI)) are used as the electrolyte.

The electrochemical test of the electrode, manufactured as previously described, takes place according to the following test plan:

five complete cycles (discharging and charging) at C/10;
1 discharging at C/5, then charging at C/10;
1 discharging at C/2, then charging at C/10;
1 discharging at 1/C, then charging at C/10; and
1 discharging at C/10, then charging at C/10.

Here, discharging at C/5 means, for example, a (complete) discharging over a period of 5 hours at constant power; similarly, charging at C/10 means, for example, a (complete) charge over a period of 10 hours at constant power.

Figure 1:
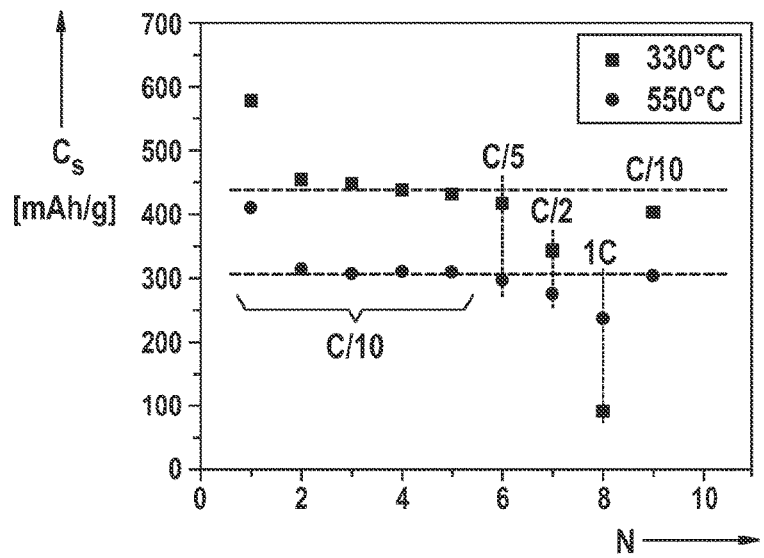
FIG. 1 shows a graph, which shows the capacity curve of a composite material according to the present invention used in an energy store, compared to a comparison sample.

The charging or discharging behavior is shown in FIG. 1, which shows a diagram, where the number of cycles N is plotted against the specific capacity $C_S$ [mAh/g] in relation to the amount of produced active material. FIG. 1 shows that the sample produced according to the present invention at a reaction temperature of 550° C. initially has a lower specific capacity than the comparison sample, which has been manufactured at 330° C. Generally, the loss in capacity over several charging cycles or discharging cycles is similar, and in particular the example according to the present invention is generally stable as of the second cycle. FIG. 1 shows, however, that the loss in capacity has a greater impact at higher current rates (1C) on the comparison sample, which has been manufactured at 330° C. Essentially, 20% of the capacity which this cell achieves at C/10 may still be achieved. However, the sample according to the present invention shows a significantly lower drop in capacity at such high rates.

Figure 2A:
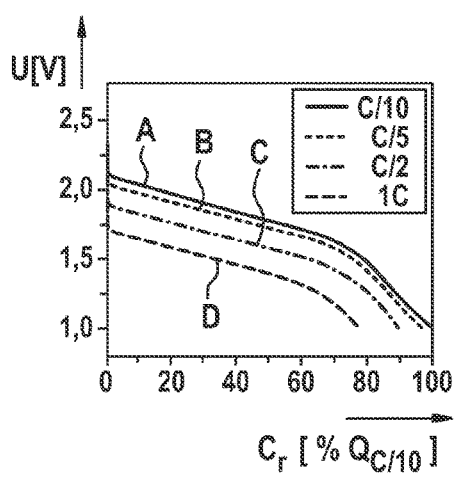
FIG. 2 shows a graph, which shows the voltage curve within a rate test of a composite material according to the present invention used in an energy store, compared to a comparison sample.
Figure 2B:
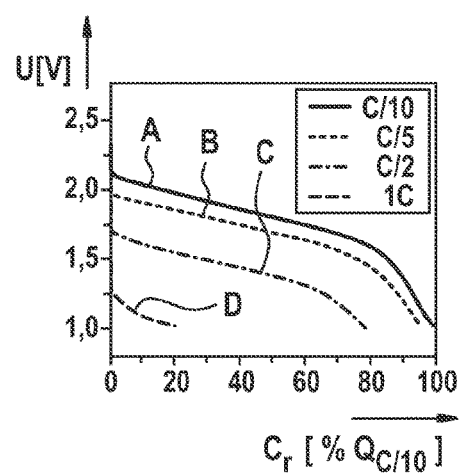

Furthermore, FIG. 2 shows a diagram in which relative capacity $C_r$ [n % of $Q_{C/10}$] is plotted against the voltage U (against an Li/Li+ electrode in [v]). It shows four curves, which show discharging rates for discharging at 10 hours (curve A), 5 hours (curve B), 2 hours (curve C) and 1 hour (curve D), FIG. 2a showing the sample according to the present invention and FIG. 2b showing the comparison sample. In FIG. 2 it is apparent that the voltage has considerably decreased. Besides the loss in capacity associated with this, this also results in another greater reduction of the energy density, which is calculated from the product of the cell capacity and the cell voltage. It is again apparent in FIG. 2 that the capacity of the comparison sample may be reduced to up to 20% at high rates (see curves D) (FIG. 2b), whereas the capacity of the sample according to the present invention (FIG. 2a) is considerably more stable.

Figure 3:
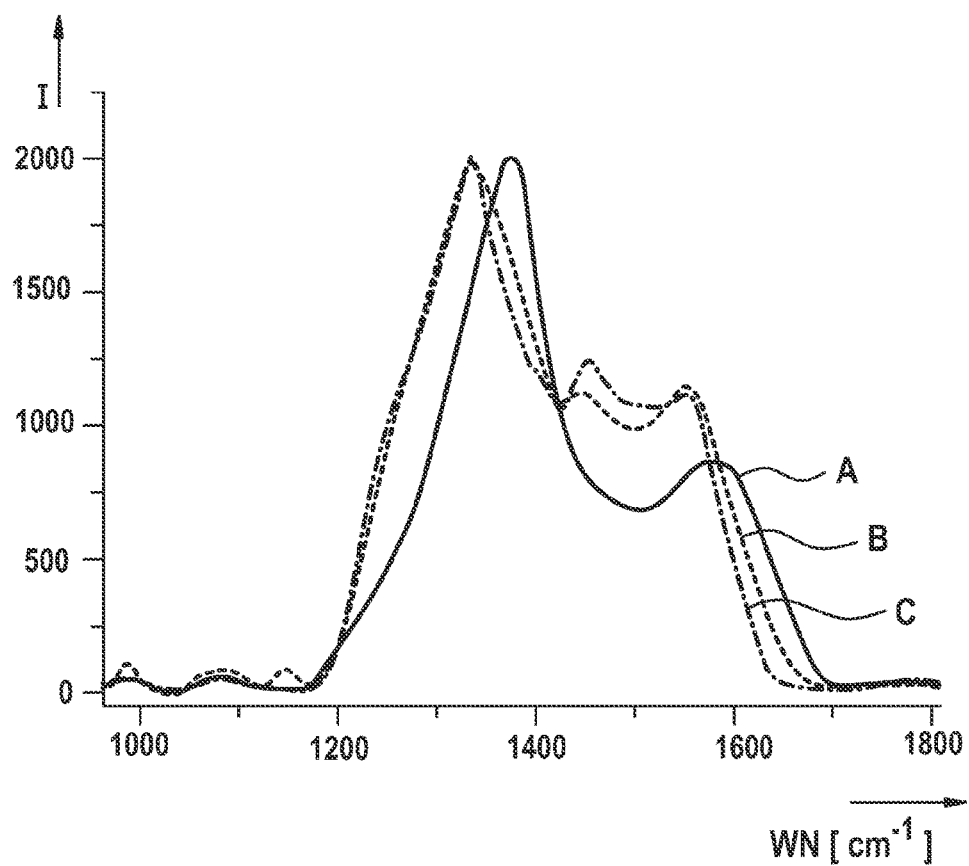
FIG. 3 shows a detail of a Raman spectrum of a composite material according to the present invention and a comparison sample and a sulfur-free, cyclized polyacrylonitrile sample.

FIG. 3 furthermore shows a Raman spectrum, in which the wave number [cm$^{-1}$] is plotted against the intensity [arbitrary unit]. Here, curve A corresponds to a sulfur-free polyacrylonitrile cyclized in air, curve B corresponds to a composite material according to the present invention, and curve C corresponds to the comparison sample. The higher proportion of the sp$^2$ hybridized C atoms in curve B (according to the present invention) is clearly evident, since the intensity ratio of "D-bands" (1332 cm$^{-1}$) to "G-bands" (1551 cm$^{-1}$) is higher at 1.68 than in the reference sample. Furthermore, the position of "G-bands" is higher at 1551 cm$^{-1}$ than in the reference sample (1546 cm$^{-1}$). The SPAN according to the present invention (curve B) thus shows an sp$^2$ hybrid proportion of greater than or equal to 95%.

What is claimed is:

1. A method for manufacturing a polyacrylonitrile-sulfur composite material, wherein the polyacrylonitrile-sulfur composite material has an sp$^2$ hybrid proportion greater than or equal to 85% with respect to the total carbon atoms included in the composite material, the method comprising:
   a) reacting polyacrylonitrile with sulfur at a first temperature of greater than or equal to 550° C., wherein the sulfur is used in excess;
   b) immediately removing the excess sulfur from a product obtained in method step a) by purifying the product; and
   c) drying the purified product.

2. The method as recited in claim 1, wherein the purification according to method step b) is carried out by a Soxhlet extraction.

3. The method as recited in claim 2, wherein the Soxhlet extraction is carried out using an organic solvent.

4. The method as recited in claim 1, wherein at least method step a) is carried out under an inert gas atmosphere.

5. The method as recited in claim 1, wherein during method step a) a cyclized polyacrylonitrile reacts with sulfur to form a polyacrylonitrile-sulfur composite material having an sp$^2$ hybrid proportion of greater than or equal to 85%, the cyclized polyacrylonitrile being obtained through a reaction of polyacrylonitrile to cyclized polyacrylonitrile.

6. The method as recited in claim 1, wherein polyacrylonitrile is reacted with sulfur in the presence of a catalyst.

7. The method as recited in claim 1, wherein a weight ratio of sulfur to polyacrylonitrile is greater than or equal to 2:1.

8. A method for manufacturing an active material for an electrode, including a method for manufacturing a polyacrylonitrile-sulfur composite material, wherein the polyacrylonitrile-sulfur composite material has an sp$^2$ hybrid proportion greater than or equal to 85% with respect to the total carbon atoms included in the composite material, the method comprising:
   a) reacting polyacrylonitrile with sulfur at a temperature of greater than or equal to 550° C., wherein the sulfur is used in excess;
   b) immediately removing the excess sulfur from a product obtained in method step a) by purifying the product; and
   c) drying the purified product.

9. The method as recited in claim 8, wherein the electrode is a cathode of a lithium-sulfur battery.

10. The method as recited in claim 8, wherein the method furthermore includes the following method step:
    d) admixing at least one electrically conductive additive to the polyacrylonitrile-sulfur composite material.

11. The method as recited in claim 10, wherein the additive includes one of carbon black, graphite, carbon fibers, carbon nanotubes, and mixtures thereof.

12. The method as recited in claim 10, wherein the method furthermore includes the following method step:
    e) admixing at least one binder to the polyacrylonitrile composite material.

13. The method as recited in claim 12 wherein the binder includes at least one of polyvinylidene fluoride and polytetrafluoroethylene.

14. The method as recited in claim 12, wherein
    in method step d) and in method step e), greater than or equal to 60 wt.-% to less than or equal to 90 wt.-% polyacrylonitrile-sulfur composite material is used,
    in method step d), greater than or equal to 0.1 wt.-% to less than or equal to 30 wt.-% electrically conductive additives are admixed, and
    in method step e), greater than or equal to 0.1 wt.-% to less than or equal to 30 wt.-% binders are admixed.

15. A polyacrylonitrile-sulfur composite material, manufactured using a method for manufacturing a polyacrylonitrile-sulfur composite material, wherein the polyacrylonitrile-sulfur composite material has an sp$^2$ hybrid proportion greater than or equal to 85% with respect to the total carbon atoms included in the composite material, the method comprising:
    a) reacting polyacrylonitrile with sulfur at a temperature of greater than or equal to 550° C., wherein the sulfur is used in excess;
    b) immediately removing the excess sulfur from a product obtained in method step a) by purifying the product; and
    c) drying the purified product.

16. A method of using a polyacrylonitrile-sulfur composite material manufactured using a method for manufacturing a polyacrylonitrile-sulfur composite material, wherein the polyacrylonitrile-sulfur composite material has an sp$^2$ hybrid proportion greater than or equal to 85% with respect to the total carbon atoms included in the composite material, the manufacturing method comprising:
  a) reacting polyacrylonitrile with sulfur at a temperature of greater than or equal to 550° C., wherein the sulfur is used in excess;
  b) immediately removing the excess sulfur from a product obtained in method step a) by purifying the product; and
  c) drying the purified product,
  wherein the polyacrylonitrile-sulfur composite material is used as an active material in an electrode.

17. The method as recited in claim 16, wherein the electrode is a cathode of a lithium-ion battery.

18. An energy store, comprising an electrode with an active material which includes a polyacrylonitrile-sulfur composite material manufactured using a method for manufacturing a polyacrylonitrile-sulfur composite material, wherein the polyacrylonitrile-sulfur composite material has an $sp^2$ hybrid proportion greater than or equal to 85% with respect to the total carbon atoms included in the composite material, the method comprising:
  a) reacting polyacrylonitrile with sulfur at a temperature of greater than or equal to 550° C., wherein the sulfur is used in excess;
  b) immediately removing the excess sulfur from a product obtained in method step a) by purifying the product; and
  c) drying the purified product.

19. The energy store as recited in claim 18, wherein the energy store includes a lithium-sulfur battery.

20. The method as recited in claim 12, wherein
  in method step d) and in method step e), greater than or equal to 65 wt.-% to less than or equal to 75 wt.-% polyacrylonitrile-sulfur composite material is used,
  in method step d), greater than or equal to 5 wt.-% to less than or equal to 20 wt.-% electrically conductive additives are admixed, and
  in method step e), greater than or equal to 5 wt.-% to less than or equal to 20 wt.-% binders are admixed.

21. The method as recited in claim 1, wherein the method furthermore includes a method step, after method step a) and before method step b), of further reacting polyacrylonitrile with sulfur at a second temperature that is higher than the first temperature.

* * * * *